US006604747B2

(12) United States Patent
Moore

(10) Patent No.: US 6,604,747 B2
(45) Date of Patent: *Aug. 12, 2003

(54) STOWABLE RESCUE DEVICE FOR PATIENT TRANSPORT

(75) Inventor: William A. Moore, Geuda Springs, KS (US)

(73) Assignee: B & M Welding, Inc., Arkansas City, KS (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,620

(22) Filed: Jul. 29, 1998

(65) Prior Publication Data

US 2002/0153680 A1 Oct. 24, 2002

(51) Int. Cl.[7] .......... B62B 13/16
(52) U.S. Cl. .......... 280/20; 280/5.24
(58) Field of Search .......... 280/5.2, 5.24, 280/8, 10, 18, 19, 20, 24, 28, 32, 32.6; 297/378.1, 378.12, 378.13; 248/231.91, 201, 210, 211; 16/24, 25, 26; 211/104, 106

(56) References Cited

U.S. PATENT DOCUMENTS

| | | | | | |
|---|---|---|---|---|---|
| 1,218,519 | A | | 3/1917 | Bradley | |
| 2,175,748 | A | | 10/1939 | Dunn | |
| 2,830,824 | A | * | 4/1958 | Young | 16/26 |
| 2,862,719 | A | * | 12/1958 | Morz | 280/18 |
| 3,169,779 | A | * | 2/1965 | Haab | 280/18 |
| 3,199,887 | A | | 8/1965 | McKelvey | |
| 3,224,032 | A | * | 12/1965 | McLean | 16/26 |
| 3,285,447 | A | * | 11/1966 | Junion | 16/24 |
| 3,394,942 | A | * | 7/1968 | Smith et al. | 280/5.24 |
| 3,600,000 | A | | 8/1971 | Bergstrom | |
| 3,741,577 | A | * | 6/1973 | Rude | 280/18 |
| 3,912,290 | A | | 10/1975 | Rich | |
| 4,136,888 | A | | 1/1979 | Bowie, Jr. et al. | |
| 4,243,238 | A | * | 1/1981 | Johnson | 280/20 |
| 4,473,234 | A | | 9/1984 | Egen | |
| 4,688,813 | A | | 8/1987 | Misawa et al. | |
| 4,717,362 | A | * | 1/1988 | Kraft | 280/18 |
| 4,909,524 | A | | 3/1990 | Paine | |
| 4,968,046 | A | * | 11/1990 | O'Connell et al. | 280/19 |
| 5,092,615 | A | * | 3/1992 | Gregalis | 280/8 |
| 5,179,746 | A | * | 1/1993 | Rogers | 280/5.24 |
| 5,253,885 | A | | 10/1993 | McCracken et al. | |
| 5,306,026 | A | * | 4/1994 | Jesse | 280/18 |
| 5,366,271 | A | * | 11/1994 | Johnston et al. | 297/378.12 |
| 5,412,838 | A | * | 5/1995 | Yang | 16/26 |
| 5,527,051 | A | * | 6/1996 | Plaza | 280/32.6 |
| 5,839,589 | A | * | 11/1998 | Hillard | 248/201 |

FOREIGN PATENT DOCUMENTS

| | | | | |
|---|---|---|---|---|
| CH | 392278 | * | 9/1965 | 280/18 |
| FR | 70437 | * | 5/1959 | 280/18 |
| SU | 1049321 | | 4/1980 | |
| SU | 1311987 | | 1/1986 | |
| WO | 81/02716 | * | 10/1981 | 280/18 |

* cited by examiner

*Primary Examiner*—Frank Vanaman
(74) *Attorney, Agent, or Firm*—Kyle L. Elliott; Blackwell Sanders Peper Martin LLP

(57) ABSTRACT

A rescue device (20) having a sled body (22), back support member (24), safety belts (26, 28, 30), and a lowering strap (32) is utilized to lower incapacitated individuals down inclined terrain such as stairs. The sled body (22) includes a plurality of reinforcing corrugations (46, 64, 72, 88, 98) and a plurality of integral components such as a U-shaped perimeter edge (44) and hand holds (92) which make the sled body (22) more rigid, so that the entire device weighs only twenty-one pounds. A hanging apparatus (128) is provided in combination with the device (20) and includes hanging arms (132) which extend through handle openings (96) of the sled body (22) to store the device (20).

20 Claims, 4 Drawing Sheets

STOWABLE RESCUE DEVICE FOR PATIENT TRANSPORT

BACKGROUND OF THE INVENTION

This invention relates to rescue devices and, more particularly, to light weight stowable rescue devices for manually transporting incapacitated patients across inclined and flat terrain.

Countless individuals work or live in buildings having many floors, and during various emergency situations, such as fires or electrical failures, the elevators are unavailable for use. Thus, the only way to exit the buildings in these situations is to traverse the stairs. However, for the elderly, disabled, and injured, traversing even a single flight of stairs, much less fifteen or twenty flights, is not a realistic option. Therefore, it is necessary for such incapacitated individuals to have assistance in safely exiting the buildings.

Various devices have been developed to help incapacitated individuals exit buildings. One such device is shown in U.S. Pat. No. 5,253,885 to McCraken et al. which is hereby fully incorporated herein by reference. The '885 device gives a strong able bodied individual the ability to safely lower an incapacitated individual down many flights of stairs while safely and securely standing at the tops of each flight of stairs. Clearly, the able bodied individual must be strong enough to lower the combined weight of the device and its passenger in a controlled fashion. Thus, the weight of the device is significant. The '885 device weighs approximately fifty pounds, and this high weight restricts the use of the '885 device to strong individuals especially when there are many flights of stairs to be traversed.

After the stairs have been traversed, it is frequently necessary to move the incapacitated individual some distance on a substantially horizontal surface in order to reach safety. Without the help of gravity to move the '885 device and its passenger, pulling the '885 device becomes a difficult task. Further, the '885 device includes many separate parts making it expensive to manufacture.

Thus, reduction in the weight of rescue devices is desirable to enhance the rescue capabilities of the devices allowing a greater number of individuals to utilize the devices. It is also desirable to enhance the movement of rescue devices across substantially horizontal surfaces to increase the usefulness of rescue devices. Further, it is desirable to produce a rescue device with fewer separate parts to reduce manufacturing cost.

BRIEF SUMMARY OF THE INVENTION

There is, therefore, provided in the practice of the invention a novel rescue device, which is light weight and movable across substantially horizontal surfaces, for transporting incapacitated individuals. The rescue device includes a sled body with a plurality of reinforcing corrugations. A back support member is attached to the sled body, and a lowering strap is attached to one of either of the sled body or the back support member. At least one safety belt is provided to hold the individual being transported.

In a preferred embodiment, the reinforcing corrugations include bottom reinforcing corrugations, foot end reinforcing corrugations, back end reinforcing corrugations, and sidewall reinforcing corrugations formed in the respective components of the sled body. A top perimeter edge of the sled body includes a U-shaped reinforcing lip to further strengthen the sled body. The front and rear corners of the sled body are beveled, and the back support member is preferably hingably attached to the sled body. The back support member includes a lower panel engaging a back support member engaging surface of the sled body. The back support member also includes an upper panel inclined relative to the lower panel and opposed side panels attached to and incline relative to the upper panel.

The sled body also preferably includes a plurality of integral raised hand holds formed in the perimeter edge of the sled body. Cylindrical reinforcing members are received in the hand holds, and handle openings extend through the side walls adjacent to the hand holds. Preferably, the handle openings are sized to receive a gloved hand. Integral hand rests are also formed in the perimeter edge of the sled body, and integral foot rests are formed in the bottom of the sled body.

A latching mechanism preferably includes an elastomeric latch centrally connected to the sled body and a catch centrally connected to the back support member. A plurality of rollers are preferably attached to the sled body to transport the rescue device across substantially horizontal terrain. The rollers extend only a small distance beyond the bottom extremity of the sled body, so that the sled body can smoothly traverse the stairs.

There is further provided in the practice of the invention the novel rescue device in combination with a hanging apparatus which includes a wall component for mounting on a wall and opposed hanging arms attached to the wall component. The hanging arms extend through the handle openings of the sled body, and a pair of elongated hanging tabs are attached to the outer ends of the hanging arms to hold the rescue device on the hanging apparatus.

In a preferred embodiment, the hanging arms extend away from the wall component at angles, so that the outer ends of the hanging arms are spaced away from the wall. Preferably, the wall component, hanging arm, and hanging tabs are integrally formed.

Accordingly, it is an object of the present invention to provide an improved rescue device for transporting incapacitated individuals across inclined and substantially horizontal terrain.

It is another object of the present invention to provide an improved hanging apparatus in combination with a rescue device for storing the rescue device in convenient locations.

BRIEF DESCRIPTION OF THE DRAWINGS

These and other inventive features, advantages, and objects will appear from the following Detailed Description of The Preferred Embodiments when considered in connection with the accompanying drawings in which similar reference characters denote similar elements throughout the several views and wherein.

DETAILED DESCRIPTION OF THE PREFERRED EMBODIMENTS

Figure 1:
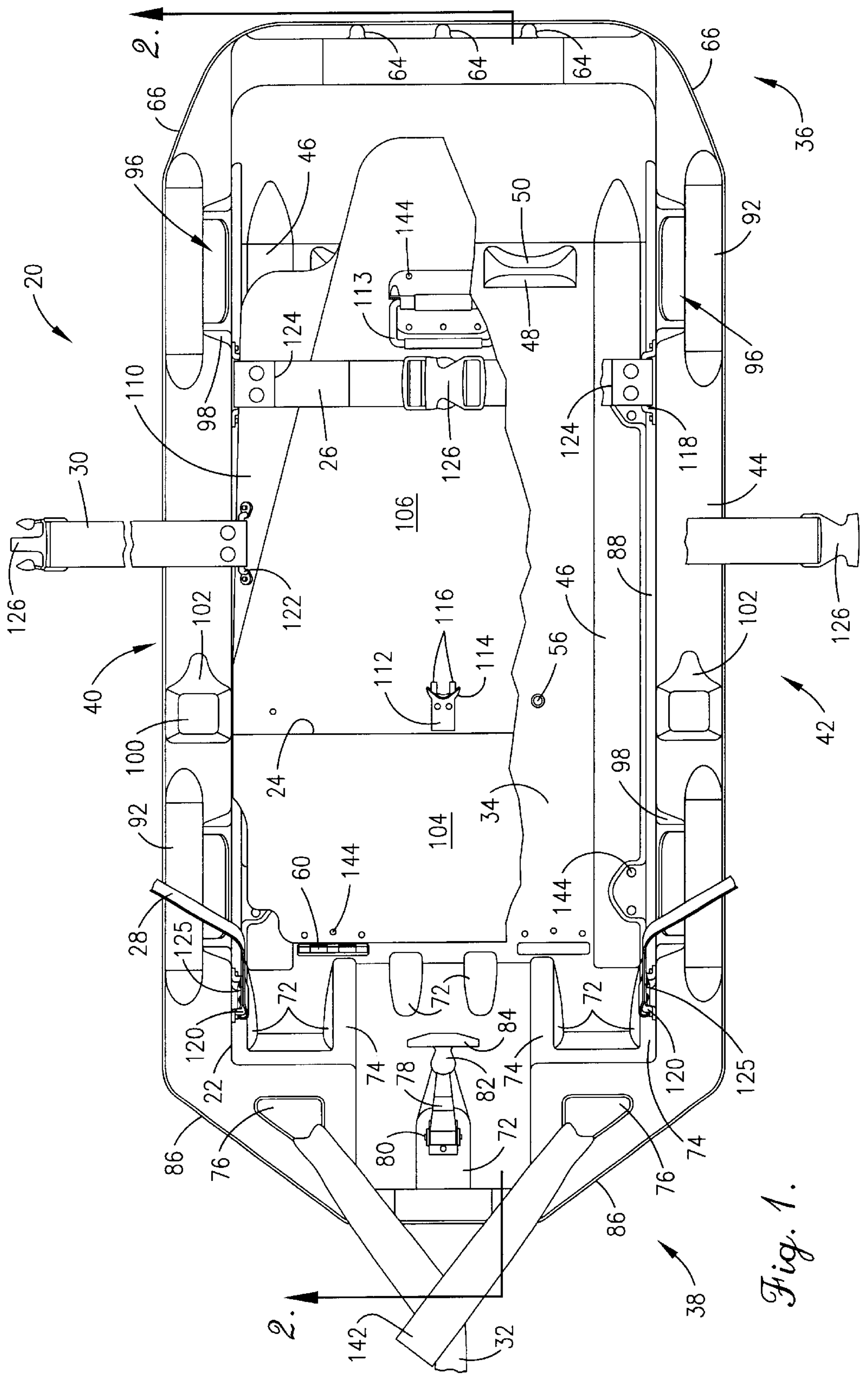
FIG. 1 is a top view of a stowable rescue device for patient transport according to the present invention illustrating a seat back of the rescue device in a stored position and having a portion of the seat back broken away for illustration.
Figure 2:
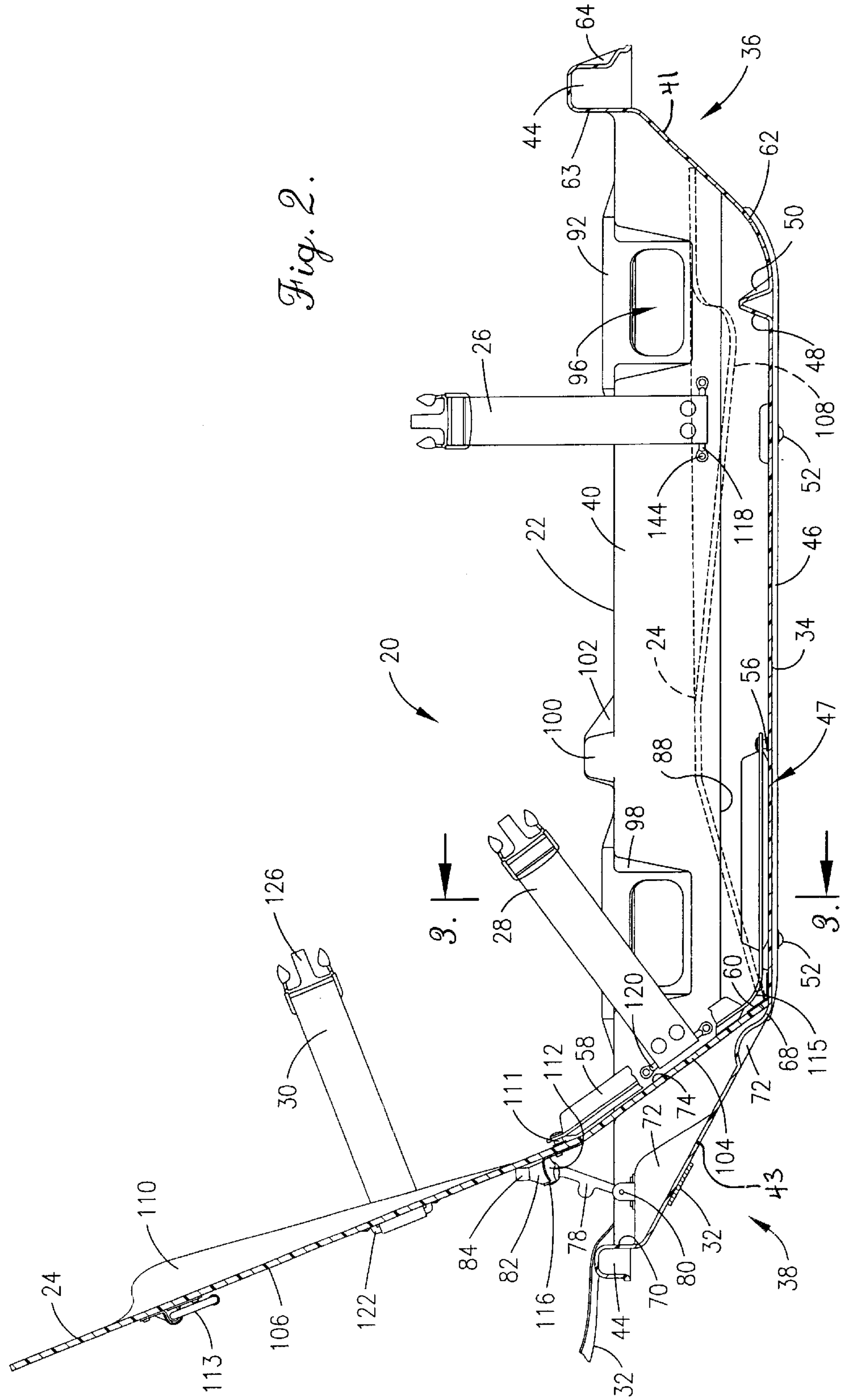
FIG. 2 is a longitudinal and vertical cross-sectional view of the rescue device of FIG. 1 taken along line 2—2 in FIG. 1 and illustrating the seat back in a transport position.
Figure 3:
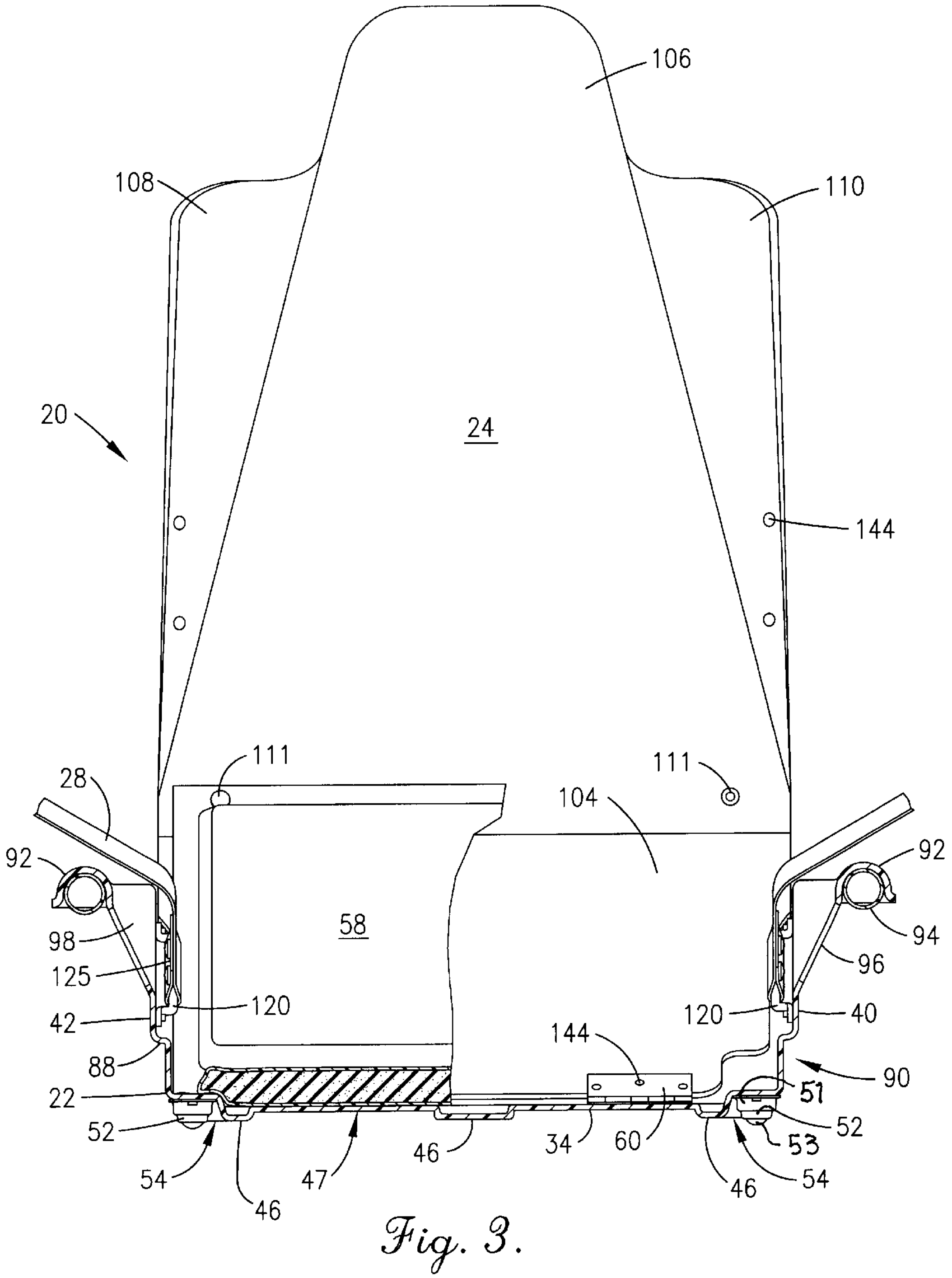
FIG. 3 is a transverse and vertical cross-sectional view of the rescue device of FIG. 1 taken along line 3—3 in FIG. 2 and illustrating the seat back in a transport position.
Figure 4:
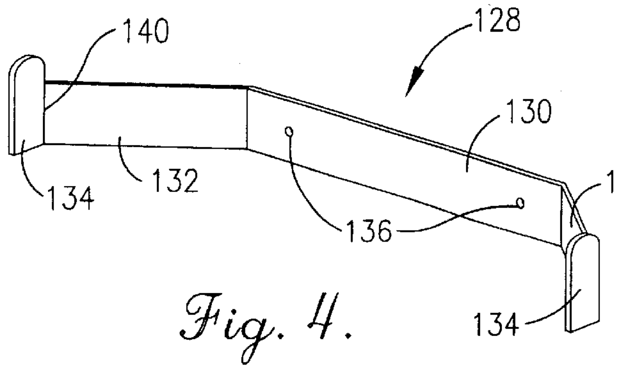
FIG. 4 is a perspective view of a hanging apparatus for stowing the rescue device of FIG. 1.
Figure 5:
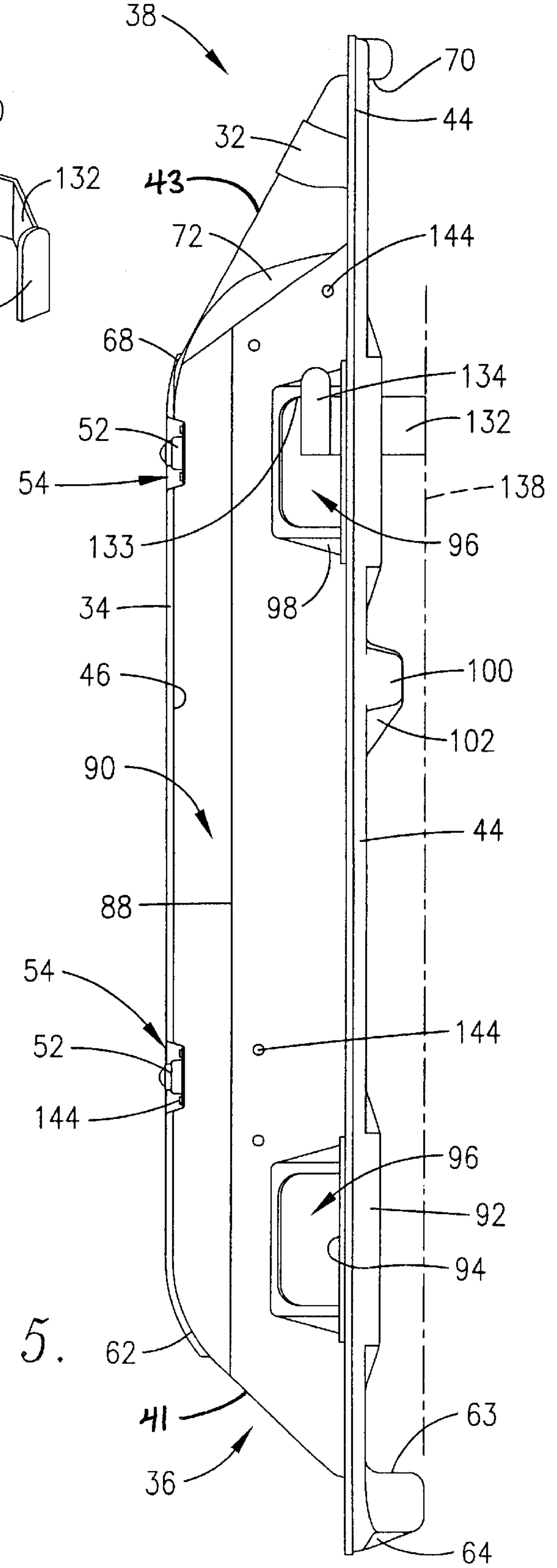
FIG. 5 is a side view of the rescue device of FIG. 1 stored on the hanging apparatus of FIG. 4.

Referring to the drawings in greater detail, FIGS. 1–3 show a rescue device 20 having a sled body 22, back support member 24, a plurality of safety belts 26, 28, 30, and a lowering strap 32. An able bodied individual helps an incapacitated individual into the sled body 22 and secures the individual therein with the safety belts 26, 28, 30. The able bodied individual then slowly lowers the rescue device down an inclined surface such as stairs by progressively releasing the lowering strap 32.

The sled body 22 is preferably unitary and substantially rigid. The sled body includes a bottom 34, foot end 36, back end 38 opposed to the foot end 36, and opposed side walls 40, 42. The foot end 36 and back end 38 each provide an angled surface 41, 43 respectively. The sidewalls, foot end, and back end form a top perimeter edge 44. The perimeter edge 44 preferably comprises a generally U-shaped reinforcing lip extending around substantially the entire top perimeter edge 44.

The sled bottom 34 includes a plurality of bottom reinforcing corrugations 46 which strengthen the sled bottom 34. The corrugations 46 define label receiving areas 47 therebetween. Labels (not shown) can be affixed to the label receiving areas 47, and because the label receiving areas are recessed, the labels are not damaged during operation. The sled bottom 34 includes the angled surfaces 41 and 43 which buffer the impact of the sled with the ground to minimize the shock of impact and facilitate smoother transition between ground surfaces. Foot rests 48 are integrally formed in the sled bottom 34 adjacent to the foot end 36. The foot rests 48 extend upwardly from the sled bottom 34 and include curved forward faces 50 to receive heals of a passenger.

A plurality of fixed position rollers 52, preferably four, are attached to the sled bottom in recessed roller receiving areas 54 formed at the opposite edges of the sled bottom. The rollers 52 preferably comprise ⅝" ball bearing casters. Two of the rollers are positioned near the foot end 36, and the other two rollers are positioned near the back end 38. The rollers 52 extend only a small distance beyond the bottom extremity of the sled body. Therefore, the low profile rollers allow the rescue device 22 to roll smoothly across substantially flat surfaces and do not catch on stairs, so that the sled body can also smoothly traverse stairs. A pair of bottom snaps 56 are attached to the sled bottom 34 to snapably receive and hold a cushion 58. Hinges 60 are connected to the sled bottom adjacent to the back end 38 to hingably connect the back support member 24 to the sled bottom 34.

The foot end 36 of the sled body 22 extends upwardly from the sled bottom 34 and forms a curved transition 62 with the sled bottom. The foot end 36 then inclines upwardly from the sled bottom to a vertical portion 63 forming part of the U-shaped top perimeter edge 44. To provide additional foot support, the vertical portion 63 extends upwardly beyond the remainder of the top perimeter edge 44. The foot end 36 includes a plurality of foot end reinforcing corrugations 64 formed in the portion of the top perimeter edge 44 defined by the foot end. Preferably, the bottom corrugations 46 extend through the curved transition 62 into the foot end 36. The opposed front corners 66 of the foot end 36 are preferably beveled with rounded intersections to the sidewalls 40, 42. The beveled front corners prevent the foot end from catching on stairs even if the rescue device 20 is inadvertently allowed to slide freely down a flight of stairs with the longitudinal axis of the rescue device 20 at an angle to the direction of the stairs.

The back end 38 of the sled body 22 extends upwardly from the sled bottom 34 and forms a curved transition 68 with the sled bottom. The back end 38 then inclines upwardly from the sled bottom to a rear vertical portion 70. The back end 38 includes a plurality of back end reinforcing corrugations 72 which strengthen the back end. As with the foot end 36, the bottom corrugations 46 extend into the curved transition 68. The back end defines at least one and preferably two back support member engaging surfaces 74 which incline in a direction substantially parallel to the back support member 24 when the back support member is in a transport position. The back end also defines opposed lowering strap apertures 76 for connecting the lowering strap 32 to the sled body. The lowering strap apertures 76 are preferably triangular in configuration, and the U-shaped top perimeter edge divides to surround the apertures with the U-shaped perimeter edge thereby strengthening the apertures. Though the lowering strap is preferably connected to the sled body, it can be joined to either one of the sled body and the back support member.

An elastomeric latch 78 is centrally connected to one of the back end corrugations adjacent to the vertical portion 70 by a pivot connection 80. The latch 78 includes a generally spherical enlarged portion 82 and a handle portion 84. The opposed back corners 86 are preferably beveled with rounded intersections to the opposed side walls 40, 42.

The opposed side walls 40, 42 are substantially identical and will be described with reference to only one of the opposed side walls. The opposed side wall extends substantially perpendicularly upwardly from the sled bottom 34 and includes side wall reinforcing corrugations 88, 98. The side wall also includes a reflective strip receiving area 90 which receives a reflective strip (not shown) giving the device increased visibility in dim emergency lighting. The labels which affix to the label receiving areas 47 are made from the same reflective strip material, to increase visibility of the unit.

The opposed side wall also includes two integral hand holds 92 formed in the top perimeter edge 44. The hand holds are preferably raised above the top perimeter edge and have rounded tops. Cylindrical reinforcing members 94 are preferably received into the raised hand holds to reinforce the hand holds 92 and make the hand holds more comfortable. The side wall also defines two handle openings 96 formed in the handle corrugations 98 which extend outwardly from the sidewall. The handle openings 96 extend through the side wall and are positioned adjacent to and below the hand holds 92. The handle openings are sized to receive a gloved hand. Preferably, the handle openings are rectangular with dimensions of approximately 2½" by approximately 4½". The sidewall also includes an integral hand rest 100 formed in the perimeter edge 44. The hand rest 100 is raised above the perimeter edge 44 and is generally rectangular in configuration with a forwardly extending protrusion 102 which decreases in height. The edges of the hand rest 100 are rounded for comfort.

The back support member 24 is unitary and substantially rigid. The back member includes a lower portion 104, upper portion 106, and opposed side panels 108, 110. The hinges 60 are connected to the substantially planar lower portion 104 to form a hinged connection between the back member 24 and the sled body 22 whereby the back member 24 pivots between a transport position and a stored position. When the back member 24 is in the transport position, the lower portion 104 rests against the back member engaging surfaces 74 and is supported at a rearward incline relative to the sled bottom 34 substantially parallel to the back member engaging surfaces 74.

The upper portion 106 is substantially planar and juxtaposed to the lower portion 104. The upper portion 106 is inclined relative to the lower portion 104, so that the upper portion 106 is closer to a vertical position than the lower portion when the back member is in the transport position. Top snaps 111 are fastened to the upper portion 106 adjacent to the lower portion 104. The top snaps 111 connect the cushion 58 to the back member 24. The cushion includes a central fold line 115 for storage while attached to both the bottom of the sled body and back member. A handle 113 is connected to the rear of the upper portion 106 near its top. Preferably, the handle 113 is biased into a retracted position.

A catch 112 is centrally connected to the upper portion 106 to receive the enlarged portion 82 of the elastomeric latch 78. The catch comprises a cupped base 114 with a central opening to receive the enlarged portion 82. The enlarged portion 82 is generally spherical to be received in the cupped base 114. A pair of tines 116 extend upwardly from the cupped base 114 on opposite sides of the central opening to hold the enlarged portion 82 in the cupped base 114. Thus, the latch 78 and catch 112 form a latching mechanism to hold the back support member 24 in the transport position.

The opposed side panels 108, 110 are juxtaposed to the upper portion 106. The side panels are inclined relative to the upper portion 106, so that the side panels extend forwardly from the upper portion. The forwardly inclined panels stabilize the passenger on the back member 24. Preferably, the lower portion 104, upper portion 106, and side panels 108, 110 are integrally formed.

A pair of leg anchors 118 are connected to the opposed sidewalls to anchor the leg safety belt 26, and a pair of waist anchors 120 are connected to the opposed side walls to anchor the waist safety belt 28. The leg anchors 118 are adjacent the foot end 36, and the waist anchors 120 are adjacent the back end 38. Each anchor comprises a rod extending between two connection points which are fixably connected to the sidewall. The rod is spaced apart from the sidewall, so that the end of the safety belt is looped around the anchor to connect the safety belt to the anchor. Chest anchors 122, which are substantially identical to the leg and waist anchors, are connected to the rear of the upper portion 106 of the back member 24.

The leg safety belt 26 is preferably two parts with one part connected to each of the leg anchors 118. The ends 124 of the leg safety belts 26 are looped around the rod of the anchors 118 and snapped to itself, so that the ends 124 of the leg safety belts 26 are adjacent to the opposed side walls 40, 42. Thus, when the back member 24 is pivoted from the transport position to the stored position, the side panels 108, 110 slide against the belt without catching the ends 124 of the belt. Therefore, the belts are not disconnected from the anchors when the back member 24 is moved into the stored position. Further, the leg safety belt can be looped around the back support member 24 in the stored position to secure the back support member in the stored position.

The waist safety belt 28 is similarly connected to the waist anchors 120 with the ends 125 of the belt 28 toward the side walls 40, 42, and the chest safety belt 30 is similarly connected to the chest anchors 122. Adjustable buckles 126 connect each of the two parts of the leg belt 26, waist belt 28, and chest belt 30, to secure the legs, waist, and chest, respectively, of the passenger in the sled body 22. The buckles 126 are adjustable by sliding along the lengths of the belts to change lengths of operative portions of the belts thereby accommodating passengers of different sizes. The buckles preferably provide approximately 350 pounds of load resistance, and the belts are two inch wide belts of polypropylene webbing proving approximately 800 pounds of load resistance.

A hanging apparatus 128 is provided in combination with the rescue device 20 for storing the rescue device in convenient locations for use, such as the top of a flight of stairs. The hanging apparatus 128 comprises a wall component 130, opposed hanging arms 132, and elongated hanging tabs 134. The wall component is substantially flat and rigid and includes mounting apertures 136 for mounting the wall component 130 onto a support surface such as a wall 138.

The hanging arms 132 are attached to the wall component 130 and extend at an angle relative to the wall component. The angle of the hanging arms causes them to extend away from the wall 138 when the hanging apparatus 128 is mounted on the wall 138. The hanging tabs 134 are elongated and are attached to the outer ends 140 of the hanging arms and extend upwardly beyond the hanging arms 132. The hanging arms and hanging tabs are inserted through an opposed pair of handle openings 96, and an edge 133 of the handle openings rests on the handle arms. The hanging tabs 134 prevent the rescue device 20 from being inadvertently removed from the hanging apparatus. In the alternative, the rescue device can be enclosed in a cabinet.

The lowering strap 32 preferably has a loop 142 at each end and is approximately sixteen feet long. One of the loops 142 is inserted through the lowering strap apertures 76, and the other loop is pulled through the first loop to secure the lowering strap 32 to the back end 38 of the sled body 22. The lowering strap centers itself on the sled body to apply a pulling force centrally to the sled body 22.

During an emergency situation, the reflective strips guide an able bodied individual to the rescue device 20. The able bodied individual removes the rescue device 20 from the hanging apparatus 128 or cabinet and pivots the back support member 24 into the transport position shown in FIG. 2. The latch 78 is elongated and placed in the catch 112 to hold the back member 24 in the transport position. An incapacitated individual is placed in the rescue device and the safety belts 26, 28, 30 are looped around the legs, waist, and chest of the individual to secure the individual to the sled body 22 and back support member 24. The back member 24 supports the back of the passenger.

The able bodied individual then starts the device and passenger down the stairs or other inclined terrain and lowers the incapacitated individual down the stairs in a controlled fashion by slowly releasing the lowering strap 32. While lowering, the able bodied individual remains at the landing at the top of the stairs where footing is secure and stable. When the device has reached the bottom of the stairs, the able bodied individual moves to the bottom of the stairs and rolls the device on the rollers 52 to the next flight of stairs or away from the building as is appropriate. When rolling the device, the able bodied individual can pull on the lowering strap and/or push or pull with the handle 113 on the back of the back support member 24.

The rescue device 20 according to the present invention weighs only twenty-one pounds and thus provides a significant weight reduction from prior rescue devices. The integral components of the sled body such as the reinforcing corrugations 46, 64, 72, 88, the U-shaped perimeter edge 44, foot rests 48, hand rests 100, hand holds 92, handle opening corrugations 98, recessed roller receiving areas 54, and others make the sled body rigid allowing the reduction in weight. Therefore, an increased number of individuals are able to utilize the rescue device. Further, the integral components make the device 20 less costly to manufacture. Additionally, the non-integral components, such as the rollers 52 are connected with conventional fasteners such as rivets 144 which also reduces cost and weight.

Thus, a rescue device is disclosed which utilizes integral components to provide a lightweight rescue device. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. A stowable rescue device for transporting incapacitated individuals across inclined and substantially horizontal terrain:

- a unitary and substantially rigid sled body having a bottom, a foot end, a back end opposed to the foot end, opposed sidewalls, a top perimeter edge formed by the opposed sidewalls, foot end, and back end, and a plurality of reinforcing corrugations;
- a substantially rigid back support member attached to the sled body adjacent to the back end of the sled body for supporting a back of an individual being transported;
- a plurality of spherical balls received in sockets, attached to the sled bottom, forming rollers for transport of the rescue device across substantially horizontal terrain;
- an elongated lowering strap attached to at least one of the sled body and back support member; and
- at least one safety belt anchored to at least one of the sled body and back support member to hold the individual being transported.

2. The rescue device according to claim 1 wherein the plurality of reinforcing corrugations comprise bottom reinforcing corrugations, foot end reinforcing corrugations, back end reinforcing corrugations, and sidewall reinforcing corrugations.

3. The rescue device according to claim 1 wherein the top perimeter edge comprises a generally U-shaped reinforcing lip extending around substantially the entire top perimeter edge.

4. The rescue device according to claim 1 wherein the sled body comprises opposed front beveled corners and opposed back beveled corners.

5. The rescue device according to claim 1 wherein the lowering strap is attached to the sled body adjacent to the back end of the sled body to apply a pulling force centrally on the sled body.

6. The rescue device according to claim 1 wherein the back support member is hingably attached to the sled body for pivotal movement between a transport position and a stored position.

7. The rescue device according to claim 6 wherein back support member comprises a lower panel, and the sled body comprises at least one back support member engaging surface which engages and extends substantially parallel to the lower panel of the back support member.

8. The rescue device according to claim 6 further comprising a back support latching mechanism including an elastomeric latch centrally connected to the sled body adjacent to the back end of the sled body and a catch centrally connected to the back support member to catch the latch and hold the back support member in the transport position.

9. The rescue device according to claim 1 wherein the sled body comprises a plurality of integral hand holds formed in the top perimeter edge.

10. The rescue device according to claim 9 wherein the hand holds comprise raised hand holds having substantially cylindrical reinforcing members received therein.

11. The rescue device according to claim 9 further comprising a plurality of handle openings through the opposed sidewalls and adjacent to the hand holds.

12. The rescue device according to claim 11 wherein the handle openings are sized to receive a gloved hand.

13. The rescue device according to claim 1 wherein the sled body comprises opposed integral hand rests formed in the top perimeter edge.

14. The rescue device according to claim 1 wherein the sled body comprises a plurality of integral foot rests formed in the bottom of the sled body adjacent to the foot end of the sled body.

15. The rescue device according to claim 1 wherein the bottom of the sled body comprises a bottom extremity, and the rollers extend only a small distance beyond the bottom extremity to allow the sled body to smoothly traverse stairs.

16. The rescue device according to claim 1 wherein the sled bottom includes angled surfaces to buffer the impact of the sled with the ground in order to minimize the shock of impact and facilitate smoother transitions between ground surfaces.

17. The rescue device according to claim 1 wherein four rollers extend downward from the bottom surface of the sled within the perimeter edge.

18. The rescue device according to claim 1 wherein the sled body includes recessed roller receiving areas having the rollers received therein.

19. A stowable rescue device for transporting incapacitated individuals across inclined and substantially horizontal terrain:

- a unitary and substantially rigid sled body having a bottom, a foot end, a back end opposed to the foot end, opposed sidewalls, a top perimeter edge formed by the opposed sidewalls, foot end, and back end, and a plurality of reinforcing corrugations;
- a substantially rigid back support member attached to the sled body adjacent to the back end of the sled body for supporting a back of an individual being transported;
- a plurality of spherical balls received in ball support mechanisms, the ball support mechanisms substantially recessed in the sled bottom, forming rollers for transport of the rescue device across substantially horizontal terrain;
- an elongated lowering strap attached to at least one of the sled body and back support member; and
- at least one safety belt anchored to at least one of the sled body and back support member to hold the individual being transported.

20. A stowable rescue device for transporting incapacitated individuals across inclined and substantially horizontal terrain:

- a unitary and substantially rigid sled body having a bottom, a foot end, a back end opposed to the foot end, opposed sidewalls, a top perimeter edge formed by the opposed sidewalls, foot end, and back end, and a plurality of reinforcing corrugations extending along the length of the sled body;
- a substantially rigid back support member attached to the sled body adjacent to the back end of the sled body for supporting a back of an individual being transported;
- a plurality of spherical balls received in sockets, attached to the sled bottom, forming rollers for transport of the rescue device across substantially horizontal terrain;
- an elongated lowering strap attached to at least one of the sled body and back support member; and
- at least one safety belt anchored to at least one of the sled body and back support member to hold the individual being transported.

* * * * *